(12) United States Patent
Fesshaie et al.

(10) Patent No.: US 9,400,179 B2
(45) Date of Patent: Jul. 26, 2016

(54) PROPAGATION VELOCITY COMPENSATED POSITION MEASUREMENT SENSOR

(71) Applicants: Efrem Fesshaie, Norwich (GB); Brian Johnson, Saltash (GB)

(72) Inventors: Efrem Fesshaie, Norwich (GB); Brian Johnson, Saltash (GB)

(73) Assignee: Littelfuse, Inc., Chicago, IL (US)

( * ) Notice: Subject to any disclaimer, the term of this patent is extended or adjusted under 35 U.S.C. 154(b) by 134 days.

(21) Appl. No.: 14/250,087

(22) Filed: Apr. 10, 2014

(65) Prior Publication Data

US 2014/0306721 A1 Oct. 16, 2014

Related U.S. Application Data

(60) Provisional application No. 61/810,802, filed on Apr. 11, 2013.

(51) Int. Cl.
*G01R 27/28* (2006.01)
*G01B 21/16* (2006.01)
*G01D 5/48* (2006.01)

(52) U.S. Cl.
CPC . *G01B 21/16* (2013.01); *G01D 5/48* (2013.01)

(58) Field of Classification Search
CPC .......... G01R 27/02; G01R 27/26; G01R 1/30; G01B 21/16
See application file for complete search history.

(56) References Cited

U.S. PATENT DOCUMENTS

| | | | |
|---|---|---|---|
| 4,071,818 A | 1/1978 | Krisst | |
| 5,159,246 A * | 10/1992 | Ueki | H02P 6/20 318/400.06 |
| 5,714,881 A * | 2/1998 | Begin | G01B 7/003 324/207.13 |
| 5,923,164 A * | 7/1999 | Ehling | G01B 7/02 324/207.12 |
| 6,351,117 B1 * | 2/2002 | Ehling | G01B 7/003 324/207.12 |
| 6,401,883 B1 * | 6/2002 | Nyce | G01D 5/485 188/266 |
| 6,906,512 B2 * | 6/2005 | Ehling | G01D 5/485 324/207.12 |
| 7,808,231 B2 * | 10/2010 | Steinich | G01D 5/485 324/207.13 |
| 8,537,131 B2 * | 9/2013 | Chang | G06F 3/0416 345/173 |
| 2004/0145377 A1 * | 7/2004 | Sherrard | G01F 23/284 324/644 |
| 2007/0074913 A1 * | 4/2007 | Geaghan | G06F 3/044 178/18.06 |
| 2009/0224716 A1 * | 9/2009 | Vig | G05B 19/19 318/550 |
| 2010/0141243 A1 * | 6/2010 | Divicino | G01R 33/0206 324/207.21 |
| 2010/0211338 A1 * | 8/2010 | Ravot | G01R 31/086 702/59 |
| 2010/0327848 A1 * | 12/2010 | Stein | A61B 5/4528 324/76.12 |

FOREIGN PATENT DOCUMENTS

DE 102004057769 A1 6/2006

* cited by examiner

*Primary Examiner* — Tung X Nguyen
*Assistant Examiner* — Dominic Hawkins (57) ABSTRACT

A position sensing system including a waveguide, a magnet movable relative to the waveguide, and a compensator configured to compensate for a change in propagation velocity of the waveguide in determining a position of the magnet relative to the waveguide. The compensator coupled to the waveguide and configured to receive a pulse, an end of line pulse corresponding to the pulse transmitted through the waveguide, and a reflected pulse corresponding to a reflection of the pulse at a point in the waveguide. The compensator configured to determine the point based at least in part on the pulse, the end of line pulse, and/or the reflected pulse.

17 Claims, 8 Drawing Sheets

PROPAGATION VELOCITY COMPENSATED POSITION MEASUREMENT SENSOR

CROSS-REFERENCE TO RELATED APPLICATION

This application claims the benefit of U.S. Provisional Patent Application Ser. No. 61/810,802 filed Apr. 11, 2013, entitled "Temperature Compensated Position Measurement Apparatus and Method," which application is incorporated herein by reference in its entirety.

FIELD OF THE INVENTION

Embodiments of the present disclosure relate generally to waveguide based position sensors and more particularly to compensating for changes in the propagation velocity of waveguide position sensors.

GENERAL BACKGROUND

Figure 1A:
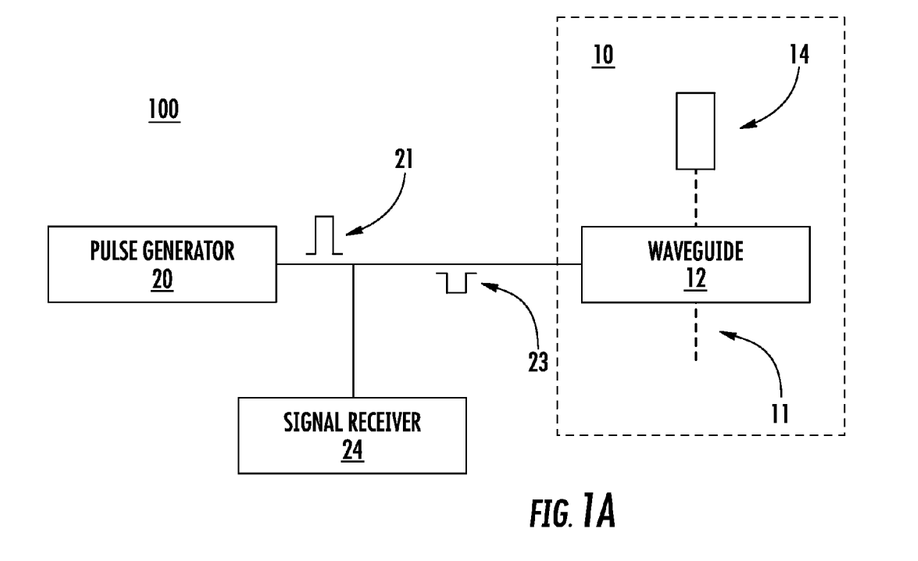
FIG. 1A shows a block diagram of a positioning sensing system.

A conventional position measurement system 100 is shown in FIG. 1A. The system 100 includes a sensor 10, a pulse generator 20, and a signal receiver 24. The sensor 10 includes a waveguide 12 and a magnet 14. Such a position measurement system is described in greater detail in European Patent Application No. 12006827.5, filed Oct. 1, 2012, which application is incorporated herein by reference in its entirety. In general, the magnet 14 is attached to a moveable object. During operation, the pulse generator 20 generates a pulse 21 that is communicated to the waveguide 12. The magnet 14 creates an impedance discontinuity 11 in a region of the waveguide 12 proximate to the magnet 14. A reflection of the pulse 21 is reflected from the point of impedance discontinuity 11, resulting in reflected pulse 23. The signal receiver 24 receives the pulse 21 and the reflected pulse 23. The position of the magnet 14 relative to the waveguide 12 can be determined based on the timing of the pulse 21 with respect to the reflected pulse 23. More specifically, the difference between the time the pulse 21 is received and the time the reflected pulse 23 is received can be used to determine the position of the magnet 14.

Figure 1B:
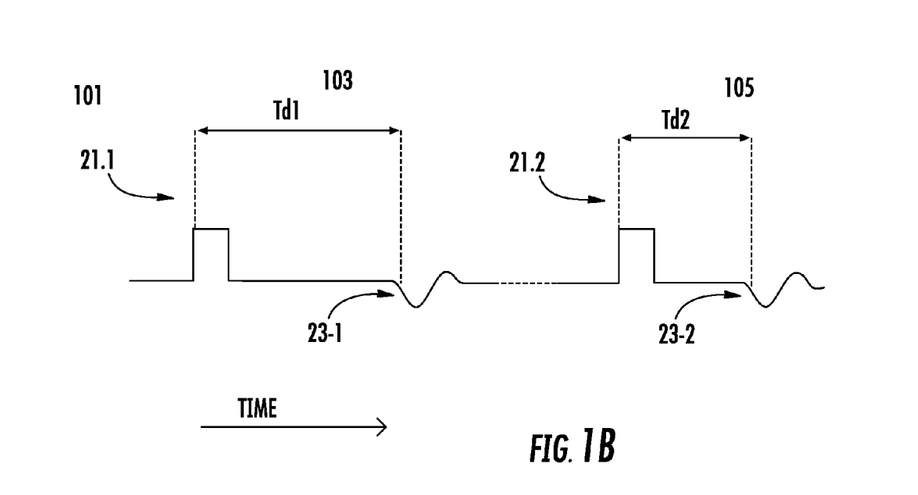
FIG. 1B shows a timing diagram associated with the position sensing system of FIG. 1A.

The waveguide 12, however, is often temperature dependent. Said differently, the timing between receipt of the pulse 21 and receipt of the reflected pulse 23 may be dependent on temperature in addition to the position of the magnet 14. More specifically, temperature may affect the permittivity, capacitance, permeability, and/or inductance of the waveguide 12. Accordingly, the velocity of waves transmitted through the waveguide 12 may change; thereby changing the speed in which the pulse 21 and the reflected pulse 23 travel through the waveguide 12. Correspondingly, the time of receipt of the reflected pulse 23 may differ even when the point of discontinuity 11 is the same. For example, FIG. 1B shows a timing diagram 101. The timing diagram 101 shows a first pulse 21-1 and a second pulse 21-2. First and second reflected pulses 23-1 and 23-2 corresponding to the first and second pulses 21-1 and 21-2 respectively are also shown. The first and second reflected pulses 23-1 and 23-2 are reflected from the point of discontinuity 11 shown in FIG. 1A. In particular, the position of the magnet 14 is the same for both reflected pulses 23-1, 23-2. However, due to changes in temperature, the time 103 ($T_{d1}$) between the first pulse 21-1 and the first reflected pulse 23-1 is different than the time 105 ($T_{d2}$) between the second pulse 21-2 and the second reflected pulse 23-2.

Conventionally, position sensors attempt to compensate for temperature by using look-up tables, or the like. However, this requires additional circuitry to measure the ambient temperature, additional memory to store the lookup table, and additional processing capability to determine the actual position based on the look-up table. Furthermore, any inaccuracy or difference between the temperature data in the lookup table and the actual temperature dependence of the waveguide 12 will result in position measurement errors.

Furthermore, the propagation velocity of waves in a waveguide may be affected by other factors in addition to temperature. For example, the propagation velocity may change over the lifetime of the waveguide. The propagation velocity may be affected by external magnetic fields. Additionally, the propagation velocity may be affected by manufacturing tolerances.

It is with respect to the above that the present disclosure is provided.

SUMMARY OF THE INVENTION

Various embodiments of the present disclosure provide a position sensing system. The position sensing system may include a waveguide configured to receive a pulse at a first end and transmit the pulse through the waveguide resulting in an end of line pulse exiting the waveguide at a second end, a magnet moveable relative to the waveguide configured to cause a reflected pulse to be reflected back to the first end of the waveguide from a point of impedance discontinuity in the waveguide proximate the magnet, and a compensator electrically coupled to the waveguide and configured to receive the pulse, the end of line pulse, and the reflected pulse and determine the point of impedance discontinuity based at least in part on the pulse, the end of line pulse and the reflected pulse.

Some examples of the present disclosure provide a position sensor comprising a pulse generator electrically coupled to a waveguide and configured to generate a pulse and communicate the pulse to a first end of the waveguide, and a position determination module electrically coupled to the waveguide, the position determination module configured to receive the pulse, an end of line pulse exiting a second end of the waveguide, and a reflected pulse reflected from a point of discontinuity in the waveguide, the position determination module further configured to determine the distance from the first end of the waveguide to the point of impedance discontinuity based on a time between receiving the pulse and the reflected pulse and a time between receiving the pulse and the end of line pulse, wherein the end of line pulse corresponds to the pulse transmitted from the first end to the second end of the waveguide.

Some examples of the present disclosure provide a method of determining a position of a magnet relative to a waveguide. The example method may include providing a waveguide, providing a magnet movable relative to the waveguide, the magnet configured to generate a point of impedance discontinuity in the waveguide proximate to the magnet, communicating a pulse to a first end of the waveguide, receiving an end of line pulse from a second end of the waveguide, the end of line pulse corresponding to the pulse transmitted from the first end of the waveguide to the second end of the waveguide, receiving a reflected pulse from the first end of the waveguide, the reflected pulse corresponding to a reflection of the pulse reflected from the point of impedance discontinuity, and determining the position of the magnet relative to the waveguide based at least in part on the end of line pulse and the reflected pulse.

DESCRIPTION OF EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

The present disclosure describes multiple example embodiments of propagation velocity compensated position sensors. In general, these examples are pulsed waveguide (PWG) based position sensors that incorporate a waveguide and a magnet. The present disclosure provides compensation by measuring both a reflected pulse and an end of line pulse (refer to FIGS. 2, 3, and 11.) It is noted, that the example sensors detailed herein may be implemented in a variety of different systems, such as, for example, fluid level systems, gearboxes, welding machines, robotic systems, or the like. Examples, however, are not to be limited in this context.

Additionally, the present disclosure may be implemented to compensate for variations in propagation velocity due to temperature, external magnetic fields, manufacturing tolerances, changes in the characteristic response of the waveguide due to the age of the waveguide, or the like. It is noted that examples herein reference compensating for the effects of temperature on the propagation velocity. This is done for convenience and clarity of presentation. However, this is not intended to be limiting.

Figure 2:
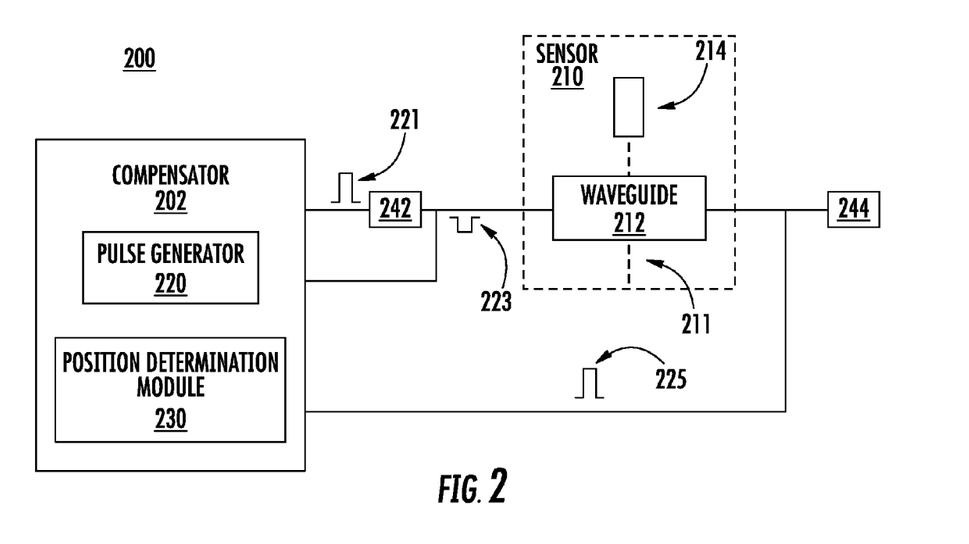
FIG. 2 is a block diagram illustrating a position sensing system.

FIG. 2 illustrates a block diagram of a position sensing system 200, arranged in accordance with at least some embodiments of the present disclosure. The system 200 includes a position sensor 210 (sometimes referred to herein as the "sensor") comprising a waveguide 212 and a magnet 214. In general, the waveguide 212 may be any type of waveguide (e.g., a microstrip waveguide, a stripline waveguide, a rectangular waveguide, or the like). Additionally, the magnet 214 may be any of a variety of types of magnets (e.g., a permanent magnet, an electromagnet, or the like). The magnet 214 is movable relative to the waveguide 212. In general, the magnet 214 creates a point of impedance discontinuity 211 in the waveguide 212. The impedance discontinuity 211 is created at the location of the magnet 214 relative to the waveguide 212. As will be described in greater detail below, the location of the waveguide 212 relative to the magnet 214 can be determined based on an initial pulse (e.g., 221), a reflected pulse (e.g., 223), and an end of line pulse (e.g., 225). In particular, this position may be determined irrespective of the propagation velocity of waves within the waveguide 212. For example, this position may be determined irrespective of the temperature of the waveguide 212.

In practice, either the magnet 214 or the waveguide 212 may be attached to a moveable object whose position is to be determined. For example, in some embodiments, the magnet 214 can be affixed to a movable object (e.g., a sewing head, a laser, a welding tip, a liquid float, or the like). The waveguide 212 can be affixed to a cooperating structure that may be placed along the path of the moveable object. As another example, in some embodiments, the waveguide 212 can be affixed to a movable object while the magnet 214 is affixed to a cooperating structure. Accordingly, during operation, as the moveable object moves, its position relative to the cooperating structure can be determined based on determining the location of the waveguide 212 relative to the magnet 214.

In order to determine the location of the waveguide 212 relative to the magnet 214, the system 200 includes a compensator 202. The compensator 202 includes a pulse generator 220 and a position determination module 230. The pulse generator 220 and the position determination module 230 are operatively connected to the waveguide 212 (e.g., via electrical connection, or the like). The pulse generator 220 is configured to generate signal pulses (e.g., pulse 221). The pulse 221 is communicated to the waveguide 212 and reflected at the point of impedance discontinuity 211, resulting in reflected pulse 223. Additionally, the pulse 221 is transmitted through the waveguide and exits the waveguide 212 as an end of line pulse 225. The compensator 202 is configured to determine the position of the waveguide 212 relative to the magnet 214 based on the pulse 221, the reflected pulse 223, and the end of line pulse 225. In some examples, the compensator 202 may be configured to determine the position of the waveguide 212 relative to the magnet 214 based at least in part by controlling the timing of the pulse 221; more specifically, by controlling the period for a series of pulses 221 (refer to FIGS. 3, and 8-10). With some examples, the compensator 202 may be configured to determine the position of the waveguide 212 relative to the magnet 214 based at least in part by comparing the time between the pulse 221 and the end of line pulse 225 to the reflected pulse 223 (refer to FIGS. 11-12). These will be explained in greater detail below. It is worthy to note, the example embodiments are described with reference to the system 200 of FIG. 2, but may be implemented with other waveguide based position sensors to compensate for variations of the propagation velocity of waves in the waveguide.

Propagation Velocity Compensating Position Sensor with Controlled Timing

Figure 3:
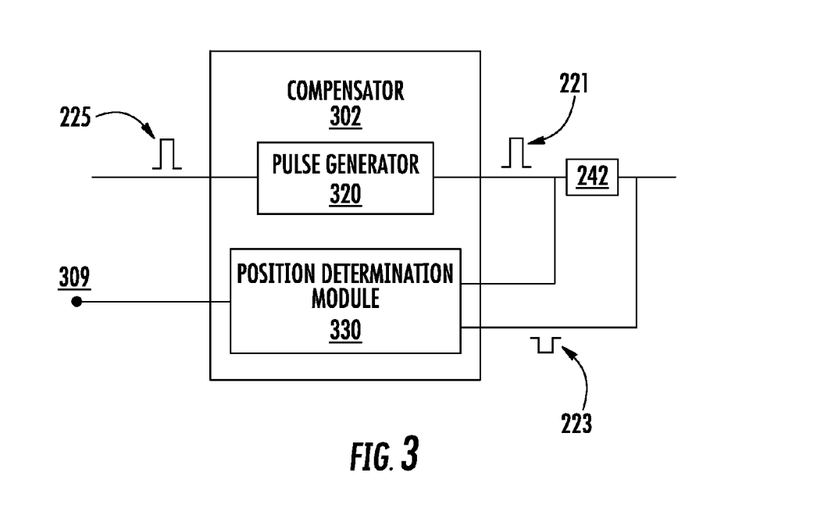
FIG. 3 is a block diagram illustrating a portion of the position sensing system of FIG. 2 in greater detail.

As noted, in some examples, the system 200 may be configured to determine the position of the waveguide 212 relative to the magnet 214 in part by controlling the timing of the pulse 221. For example, the period between pulses 221 may be controlled to compensate for temperature dependence of the time between the pulse 221 being communicated to the waveguide 212 and the reflected pulse 223 exiting the waveguide 212. FIG. 3 illustrates a block diagram of an example implementation of a compensator 302. In some examples, the compensator 302 may be implemented as the compensator 202 in the system 200 of FIG. 2. The compensator 302 includes a pulse generator 320 and a position determination module 330. As depicted, the pulse generator 320 is operably connected to the waveguide 212 to both communicate the pulse 221 to the waveguide and receive the end of line pulse 225 from the waveguide 212. Additionally, the position determination module 330 is operably connected to both the pulse generator 320 and the waveguide 212 to receive the pulse 221 and the reflected pulse 223.

Figure 4:
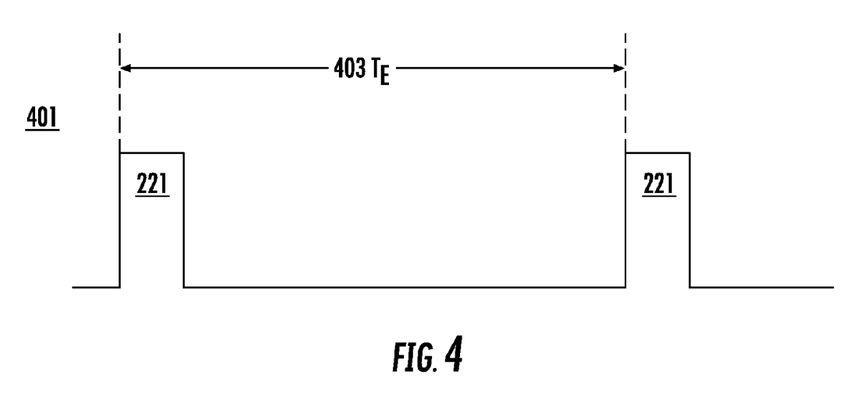
FIGS. 4-6 illustrate timing diagrams and example waveforms for signals associated with the position sensing system of FIG. 2.

The pulse generator 320 is configured to generate a series of pulses 221 where the period (e.g., the time between pulses 221) corresponds to the time between the pulse 221 and the end of line pulse 225. For example, FIG. 4 illustrates a timing diagram 401, which shows pulses 221 having a period 403 ($T_E$). As stated, the period (e.g., $T_E$) between pulses 221 is set by the pulse generator 320 to equal N times the time it takes the pulse 221 to travel down the waveguide 212.

Figure 5:
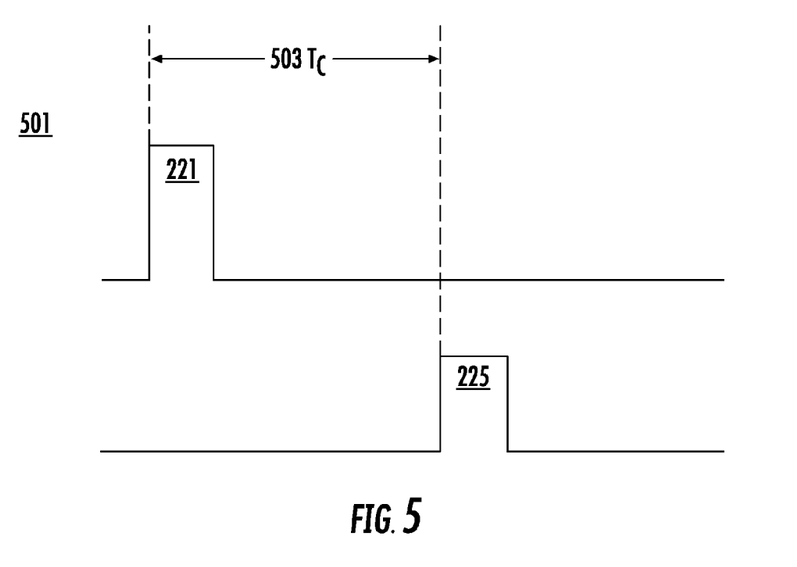

In general, the period $T_E$ may be set to equal N (where N greater than or equal to 2) times the time between the pulse 221 and the end of line pulse 225. For example, FIG. 5 illustrates a timing diagram 501, which shows the pulse 221, and a corresponding end of line pulse 225. As depicted, a time 503 ($T_C$) separates the pulse 221 and the end of line pulse 225. The time $T_C$ corresponds to the time it takes for the pulse 221 to be transmitted through the waveguide 212. The pulse generator 320 is configured to generate pulses having a period equal to N times the time between the pulse 221 and the end of line pulse 225 (e.g., $T_C$). As will be appreciated, this period may change during operation and can be dynamically updated by the pulse generator 320. Accordingly, as the temperature changes and/or the velocity of waves propagating through the waveguide 212 changes (e.g., due to temperature, or the like) the time $T_C$, and correspondingly the period $T_E$ will change. Example pulse generators configured to generate a series of pulses 221 with the period $T_E$ based on the time $T_C$ are described in greater detail below (refer to FIGS. 8-9).

It is noted, that although the period $T_E$ can be determined with N>=2, the examples provided herein use N=2 for purposes of illustration and clarity. Using N=2, the period $T_E$ can be represented by the following equation:

$$T_E = 2L/Vg(\text{temp}) \quad (1)$$

where Vg(temp) is the actual group velocity of the translating wave resulting from all perturbing causes, and L is the length of the waveguide.

Figure 6:
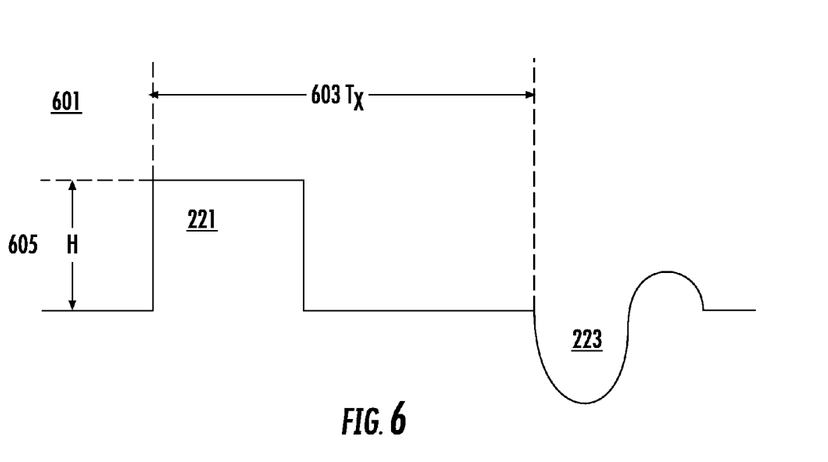

Using Equation (1), the output from the position determination module 330 (refer to FIG. 10) can be expressed as a voltage using the following equations:

$$V = H*T(x)/TE \quad (2)$$

$$Tx = 2*X/Vg(\text{temp}) \quad (3)$$

where Tx is the time difference between the pulse 221 and the reflected pulse 223, H is the magnitude of the pulse 221, and X is the position of the magnet 214 along the length of waveguide 212. For example, FIG. 6 illustrates a timing diagram 601 showing a pulse 221 and a corresponding reflected pulse 223. The time 603 (Tx) between the pulse 221 and the reflected pulse 223 as well as the magnitude 605 (H) of the pulse 221 are shown.

Figure 7:
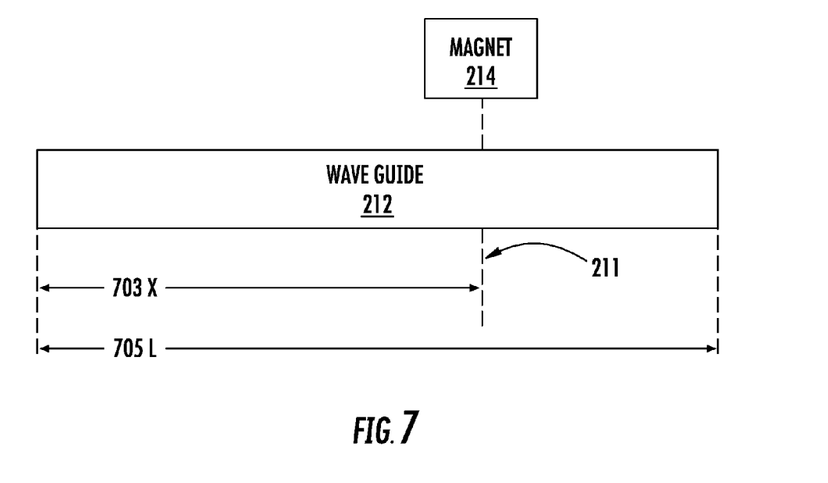
FIG. 7 is a block diagram illustrating a portion of the position sensing system of FIG. 2 in greater detail.

Furthermore, FIG. 7 illustrates a block diagram showing the position 703 (x) of the magnet 214 relative to the length 705 (L) of the waveguide 212. Using Equations (1-3), the group velocity Vg(temp) can be canceled out, and the output from the position determination module 330 can be represented as a voltage using the following equations:

$$V = H*X/L \quad (4)$$

$$X = V*L/H \quad (5)$$

As can be seen from Equation (4), the position X of the magnet 214 is now expressed independently of group velocity Vg(temp). It is noted, since X, the position of the magnet for any given time=t and pulse 221 magnitude H is constant; the measurement of the distance X of the magnet 214 relative to the length L of the waveguide 212 is temperature independent.

Additionally, the calculation below shows that the ratio of the time Tx to the period $T_E$ is equal to the ratio of the distance X to the distance L. More particularly, $$Tx = 2*X/Vg(\text{temp}) \quad (6)$$

Therefore, $$Vg(\text{temp}) = 2*X/Tx \quad (7)$$

Using Equation (1), $$Vg(\text{temp}) = 2*L/TE \quad (8)$$

Consequently from equations (7) and (8), $$2*X/T_R = 2*L/T_E \quad (9)$$

Which can be simplified into:

$$Tx/T_E = X/L \quad (10)$$

Equation 10 illustrates that by controlling the period $T_E$ to be a multiple (e.g., in this case 2) of the time $T_C$, the ratio of the time delay $T_X$ of the reflected signal, (due to the magnet position at position X), and the delay $T_E$, (two times the time for excitation signal to travel the length of the waveguide 12), is equal to the ratio of the distance of the magnet position X relative to the total length of the sensor L. This relationship is independent of the group velocity Vg(temp), consequently of all causes impacting group velocity, including temperature changes, nominal design fluctuations, quality and other variations.

Figure 8:
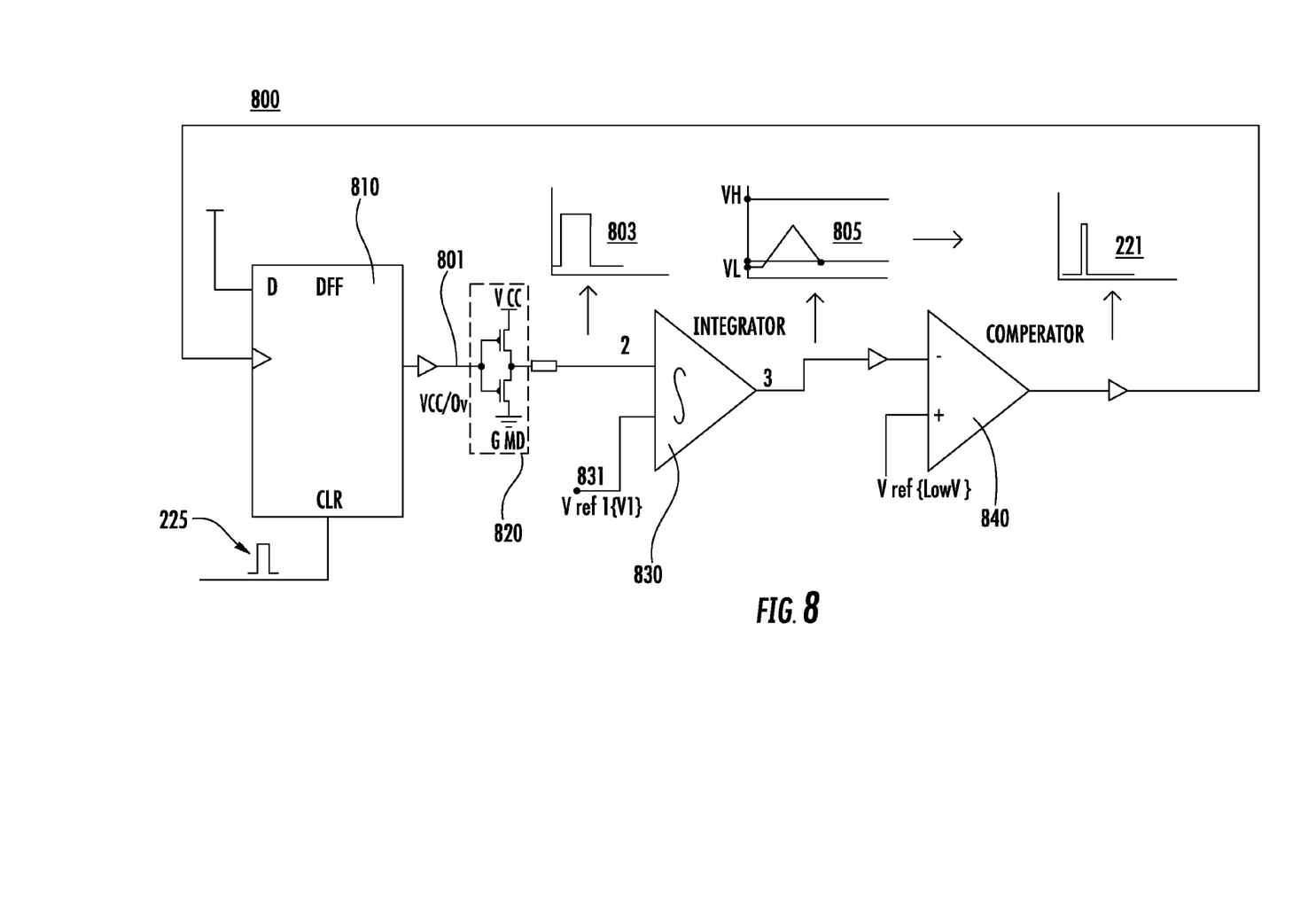
FIGS. 8-10 are block diagrams illustrating portions of the position sensing system of FIG. 3 in greater detail.
Figure 9:
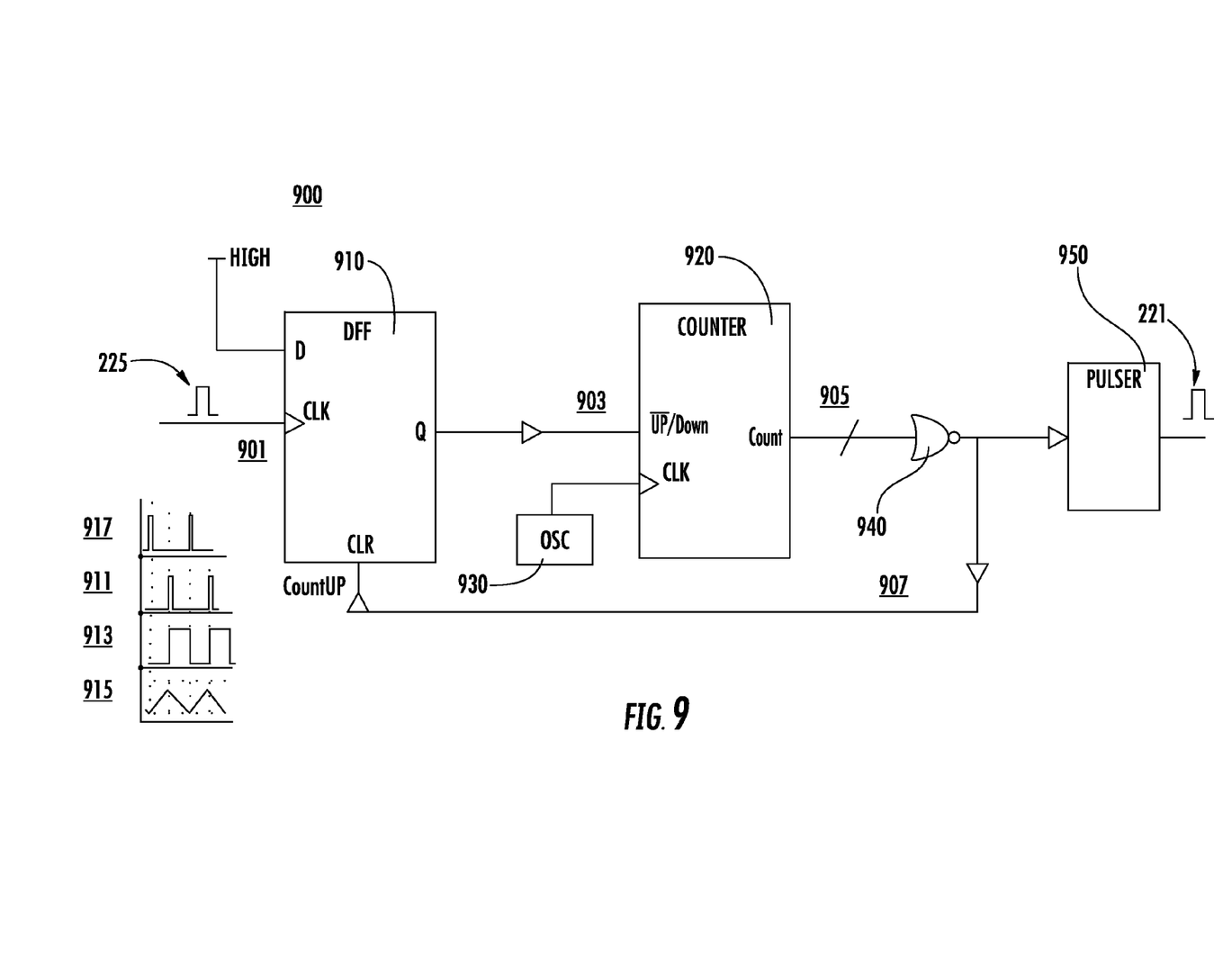

FIGS. 8-9 illustrate example signal pulse generator 320. In general, FIG. 8 illustrates an analog circuit that may be used to implement the signal pulse generator 320 while FIG. 9 illustrates a digital circuit that may be used to implement the pulse generator 320.

Turning more specifically to FIG. 8, a block diagram of a variable pulse width pulse generator circuit 800 is shown. Circuit 800 comprises a D-type flip-flop or counter 810, a buffer 820, an integrator 830, and a comparator 840, operably connected as shown. The flip-flop 810 is configured to receive as input the end of line pulse 225. The end of line pulse 225 is operably connected to the clear (CLR) input of the flip-flop 810. The flip-flop 810 is set high by feeding back the pulse 221. When the output of the flip-flop 810 is logically high, the output of the integrator 830 begins to ramp up. The output of flip-flop 810 is a voltage at circuit location 801, which is communicated to a buffer 820 (e.g., a push-pull buffer, or the like).

The output of the buffer 820 is provided to the integrator 830. The input waveform 803 to the integrator 830 is shown. The output waveform 805 of the integrator 830 is also shown. The output of the integrator 830 is communicated to comparator 840. The output of comparator 840 is set high when the integrator output falls below a reference voltage (Vref) present on the positive terminal 831 of the integrator 830. As the integrator 830 output begins to rise above the reference voltage (Vref), the output of the comparator 840 falls low.

This short pulse at the output of the comparator 840 is the pulse 221, the pulse width of which can be modified as required. By feeding back the pulse 221 and the end of line pulse 225, the frequency of the repetition of the pulse 221

(e.g., the period $T_E$) becomes dependent on the group velocity Vg(temp) at which the end of line pulse is transmitted through the waveguide 212.

Turning more specifically to FIG. 9, a block diagram of a variable pulse width pulse generator circuit 900 is shown. Circuit 900 comprises a D-type flip-flop 910, a counter 920, a clock 930, an AND Gate 940, and a conditioning circuit 950, operably connected as shown. The flip-flop 910 communicates to the counter 920, which is controlled by the clock 930. The output of the counter 920 is connected to the AND Gate 940. The output of the AND Gate 940 is fed to the clear (CLR) input of the flip-flop 910 and the conditioning circuit 950. The output of the conditioning circuit 950 is the pulse 221. The end of line pulse 225 is input to the clock (CLK) input of the flip-flop 910. The operation of the circuit 900 is substantially the same as the circuit 800 described above. Notably, waveforms 911, 913, 915, and 917 are shown corresponding to the waveforms present at points 901, 903, 905, and 907, respectively.

Figure 10:
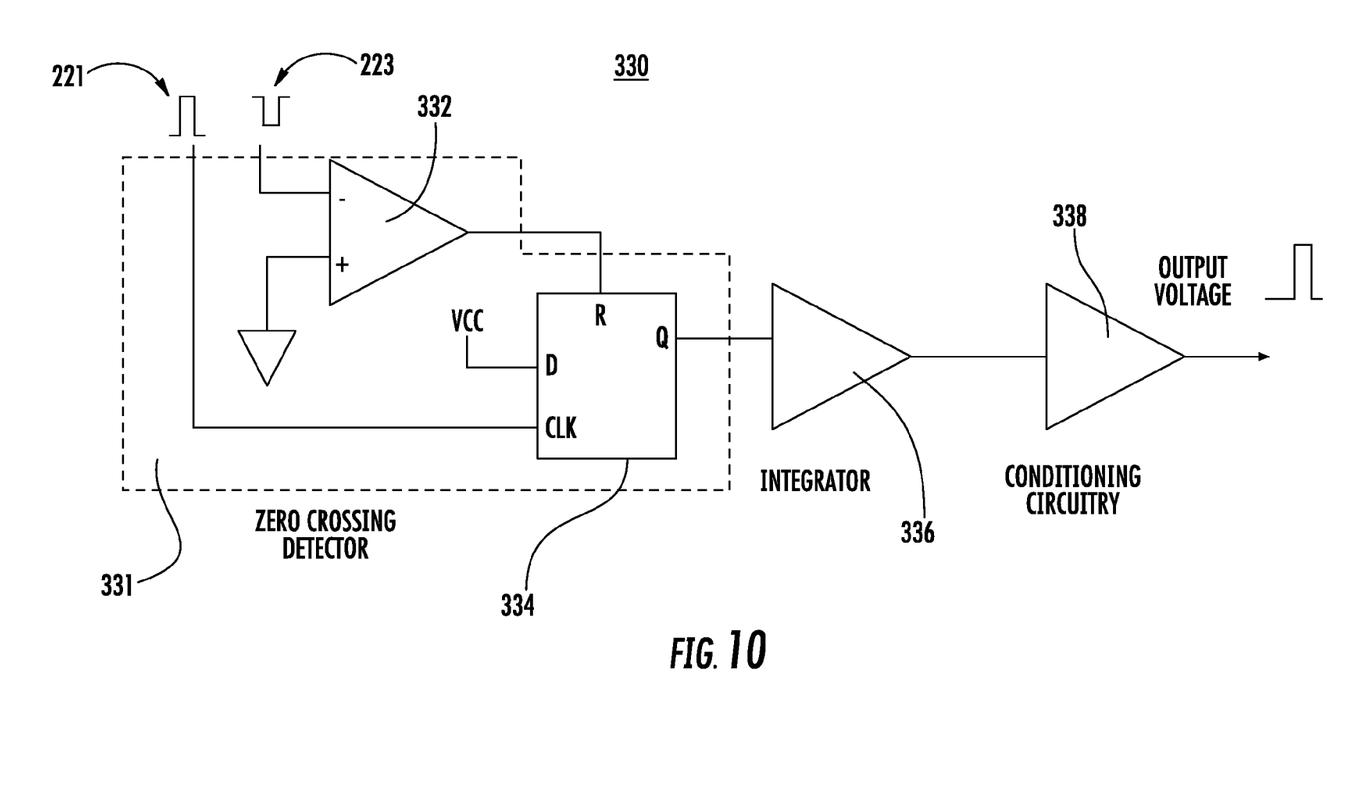

FIG. 10 illustrates a block diagram of the position determination module 330. As depicted, the position determination module 330 is implemented using a zero crossing detector 331 comprising a comparator 332 and a D-type flip-flop 334. The flip-flop 334 is set by the pulse 221 and reset by the reflected pulse 223. Said differently, the output of the flip-flop 334 is high from the time it is set by the pulse 221 to the time it is reset by the reflected pulse 223. The position determination module 330 also includes an integrator 336 and a conditioning circuit 338.

Propagation Velocity Compensating Position Sensor without Controlled Timing

Figure 11:
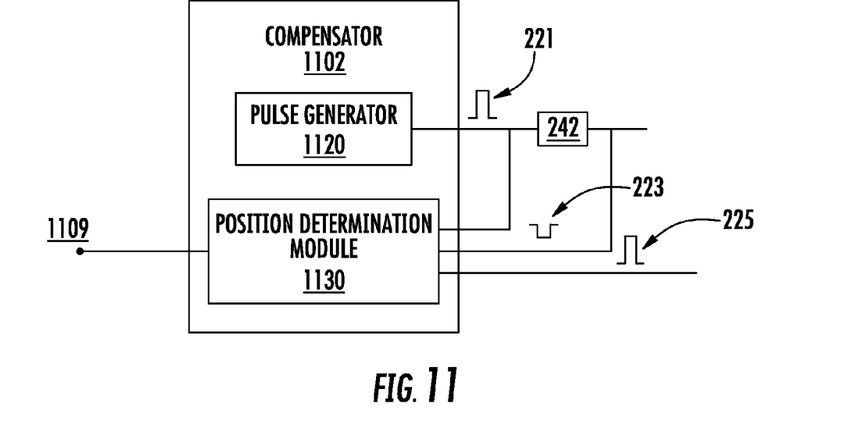
FIG. 11 is a block diagram illustrating a portion of the position sensing system of FIG. 2 in greater detail.

FIG. 11 illustrates a block diagram of an example implementation of a compensator 1102. In some examples, the compensator 1102 may be implemented as the compensator 202 in the system 200 of FIG. 2. The compensator 1102 includes a pulse generator 1120 and a position determination module 1130. The pulse generator 1120 may be any of a variety of pulse generators (e.g., VCO, or the like) configured to generate the pulse 221. It is important to note, that the pulse generator 1120 can be a standard pulse generator and need not be configured to generate a series of pulses having a period based on the end of line pulse as described above in conjunction with FIG. 3. The position determination module 1130 is configured to receive the pulse 221, the end of line pulse 225, and the reflected pulse 223 and determine the position x (refer to FIG. 7) of the magnet 214 relative to the waveguide 212. The position of the magnet 214 relative to the length L of the waveguide 212 can be output as a voltage on output 1109.

In general, the position determination module 1130 may be configured to determine the position X based on $T_C$ and $T_X$ for an arbitrary $T_E$ (refer to FIGS. 4-6). More specifically, the time between the pulse 221 and the end of line pulse 225 can be expressed as a function of the length L (refer to FIG. 7) of the waveguide 212 and the group velocity Vg(temp) as follows:

$$T_C = L/Vg(\text{temp}) \quad (11)$$

Equations 7 and 11 can be expressed as the following:

$$L/T_C = 2*X/T_X \quad (12)$$

Which can be simplified into:

$$P = TX/2*TC \quad (13)$$

where P=X/L (or the position of the magnet 214 relative to the waveguide 212).

Figure 12:
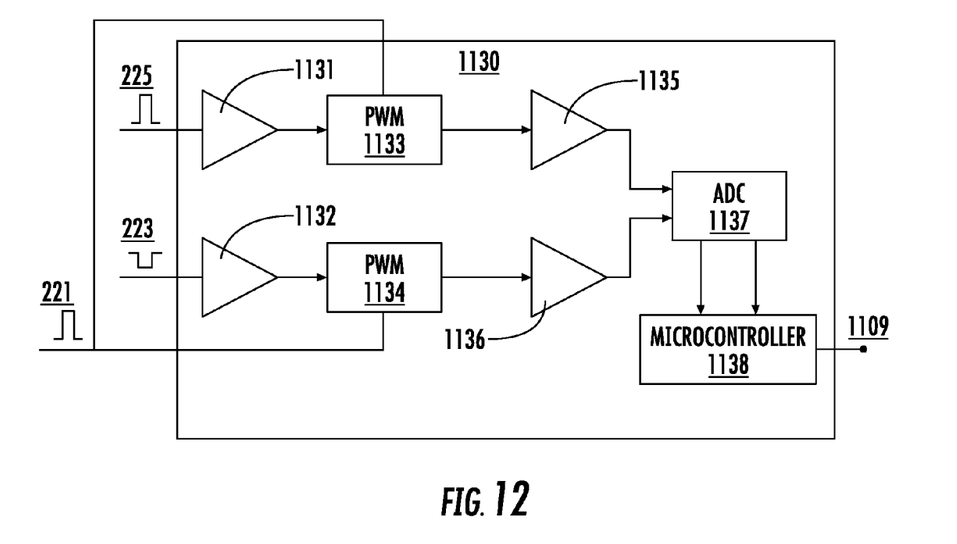
FIG. 12 is a block diagram illustrating a portion of the position sensing system of FIG. 11 in greater detail, all arranged according to at least some embodiments of the present disclosure.

FIG. 12 illustrates a block diagram of example implementation of the position determination module 1130. As depicted, the position determination module 1130 includes amplifiers 1131 and 1132, pulse width modulators 1133 and 1134, integrators 1135 and 1136 an analog to digital converter 1137, and a microcontroller 1138, operably connected as shown. During operation, the end of line pulse 225 and the reflected pulse 223 are input to the amplifiers 1131, 1132. The pulse width modulators 1133, 1134 receive the amplified end of line pulse 225 and the amplified reflected pulse 223, and generate output pulses having a duty cycle corresponding to the times $T_C$ and $T_X$. The outputs from the pulse width modulators 1133 and 1134 are input to integrators 1135 and 1136, respectively. Additionally, the outputs from the integrators 1135 and 1136 are input to the analog to digital converter 1137 (ADC). The output from the ADC 1137 is input to the microcontroller 1138. Accordingly, the microcontroller 1138 receives a digital signal from the ADC 1137 representative of the time between the pulse 221 and the end of line pulse 225 as well as the pulse 221 and the reflected pulse 223.

The microcontroller 1138 is configured to determine the position (e.g., X) of the magnet 214 relative to the length L of the waveguide 212 based on these received quantities. In some examples, the microcontroller 1138 is configured to determine the position based on Equation 13 described above.

In some examples, the position determination module 1130 may include switching circuitry to switch the inputs to the integrators 1135 and 1136. Said differently, the position determination module 1130 may be configured to repeatedly switch (e.g., based on a fixed period, or the like) the inputs to the integrators 1135 and 1136 to compensate for temperature dependent variations in the integrators output. Similarly, the inputs to the pulse width modulators 1133 and 1134 may be repeatedly switched. The microcontroller may be configured to compensate for the repeated switching. Said differently, the microcontroller 1138 may include logic and/or circuitry to determine the position of the magnet 214 relative to the waveguide 212 as described above while taking into account the periodic switching of signal within the position determination module 1130.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A position sensing system comprising:
a waveguide configured to receive a pulse at a first end and transmit the pulse through the waveguide resulting in an end of line pulse exiting the waveguide at a second end;
a magnet moveable relative to the waveguide, the magnet configured to cause a reflected pulse to be reflected back to the first end of the waveguide from a point of impedance discontinuity in the waveguide proximate the magnet; and
a compensator electrically coupled to the waveguide and configured to receive the pulse, the end of line pulse, and the reflected pulse and determine the point of impedance discontinuity based at least in part on the pulse, the end of line pulse and the reflected pulse, wherein the compensator comprises:

a pulse generator configured to generate the pulse; and
a position determination module configured to receive the pulse, the reflected pulse, and the end of line pulse and determine the point of impedance discontinuity based on a time between receiving the pulse and the reflected pulse and on a time between receiving the pulse and the end of line pulse.

2. The position sensing system of claim 1, the position determination module further configured to determine the point of impedance discontinuity as a ratio of the time between receiving the pulse and the reflected pulse and two (2) times the time between receiving the pulse and the end of line pulse.

3. The position sensing system of claim 2, wherein the ratio corresponds to the distance between the first end of the waveguide and the point of impedance discontinuity and the distance between the first and second end of the waveguide.

4. The position sensing system of claim 1, wherein the magnet comprises either a permanent magnet or an electromagnet.

5. The position sensing system of claim 1, wherein the waveguide is one of a microstrip waveguide, a stripline waveguide, or a rectangular waveguide.

6. The position sensing system of claim 1, the pulse generator configured to:
generate the pulse;
receive the end of line pulse; and
generate one or more additional pulses with a period based at least in part on a time between generating the first pulse and receiving the end of line pulse.

7. A position sensor comprising:
a pulse generator electrically coupled to a waveguide and configure to generate a pulse and communicate the pulse to a first end of the waveguide; and
a position determination module electrically coupled to the waveguide, the position determination module configured to receive the pulse, an end of line pulse exiting a second end of the waveguide, and a reflected pulse reflected from a point of discontinuity in the waveguide, the position determination module further configured to determine the distance from the first end of the waveguide to the point of impedance discontinuity based on a time between receiving the pulse and the reflected pulse and a time between receiving the pulse and the end of line pulse,
wherein the end of line pulse corresponds to the pulse transmitted from the first end to the second end of the waveguide.

8. The position sensor of claim 7, the position determination module configured to determine the distance from the first end of the waveguide to the point of impedance discontinuity based on a ratio of the time between receiving the pulse and the reflected pulse and two (2) times the time between receiving the pulse and the end of line pulse.

9. The position sensor of claim 8, wherein the ratio corresponds to the distance between the first end of the waveguide and the point of impedance discontinuity and distance between the first and second end of the waveguide.

10. The position sensing system of claim 7, wherein the point of impedance discontinuity is caused by a magnet proximate to the waveguide.

11. The position sensing system of claim 7, the position determination module comprising:
a first pulse width modulator operably coupled to the signal generator and the second end of the waveguide, the first pulse width modulator configured to receive the pulse and the end of line pulse and generate a first voltage signal corresponding to the time between receiving the pulse and the end of line pulse;
a second pulse width modulator operably coupled to the first and the second end of the waveguide, the second pulse width modulator configured to receive the reflected pulse and the end of line pulse and generate a second signal voltage corresponding to the time between receiving the reflected pulse and the end of line pulse;
a first and a second integrator electrically coupled to the first and the second pulse width modulators, the first and the second integrators configured to generate third and fourth voltage signals corresponding to the first and the second voltage signals;
an analog to digital converter electrically coupled to the first and the second integrators and configured to generate a first digital signal and a second digital signal corresponding to the third and the fourth voltage signals; and
a microprocessor electrically coupled to the analog to digital converter and configured to receive the first and the second digital signals and determine the distance between the first end of the waveguide and the point of impedance discontinuity based on the first and the second digital signals.

12. The position sensor of claim 11, wherein the microprocessor is configured to determine the distance based at least in part by dividing the first digital signal by two (2) times the second digital signal.

13. A method of determining a position of a magnet relative to a waveguide, the method comprising:
providing a waveguide;
providing a magnet movable relative to the waveguide, the magnet configured to generate a point of impedance discontinuity in the waveguide proximate to the magnet;
communicating a pulse to a first end of the waveguide;
receiving an end of line pulse from a second end of the waveguide, the end of line pulse corresponding to the pulse transmitted from the first end of the waveguide to the second end of the waveguide;
receiving a reflected pulse from the first end of the waveguide, the reflected pulse corresponding to a reflection of the pulse reflected from the point of impedance discontinuity; and
determining the position of the magnet relative to the waveguide based at least in part on the end of line pulse and the reflected pulse, wherein determining the position of the magnet relative to the waveguide comprises:
determining a time between communicating the pulse to the first end of the waveguide and receiving the end of line pulse from the second end of the waveguide; and
determining a time between communicating the pulse to the first end of the waveguide and receiving the reflected pulse from the first end of the waveguide.

14. The method of claim 13, wherein the waveguide attached to either a movable object or a cooperating structure and the magnet is attached to the other of the movable object or the cooperating structure, the method further comprising determining the position of the moveable object relative to the cooperating structure based on the determined position of the magnet relative to the waveguide.

15. The method of claim 13, determining the position of the magnet relative to the waveguide comprising determining the position of the magnet based at least in part on a ratio of the time between communicating the pulse to the first end of the waveguide and receiving the reflected pulse from the first end of the waveguide and two (2) times the time between communicating the pulse to the first end of the waveguide and receiving the end of line pulse from the second end of the waveguide.

16. The method of claim 15, wherein the ratio corresponds to the distance between the first end of the waveguide and the point of impedance discontinuity and the distance between the first and second end of the waveguide.

17. The method of claim 13, further comprising:
generating one or more additional pulses based at least in part on a time between communicating the pulse to the first end of the waveguide and receiving the end of line pulse from the second end of the waveguide; and
communicating the one or more additional pulses to the first end of the waveguide.

* * * * *